United States Patent Office 2,886,501
Patented May 12, 1959

2,886,501

PROCESS FOR SYNTHESIZING OXALIC ACID BY IRRADIATION

Torsten Hasselstrom, Framingham, and Malcolm C. Henry, Harvard, Mass.

No Drawing. Application February 8, 1956
Serial No. 564,327

16 Claims. (Cl. 204—154)

(Granted under Title 35, U.S. Code (1952), sec. 266)

The invention described herein, if patented, may be manufactured and used by or for the Government for governmental purposes, without the payment to us of any royalty thereon.

Our invention relates to a process of synthesizing oxalic acid and/or salts of oxalic acid by subjecting an inorganic bicarbonate or related compound to a source of high intensity ionizing radiation, such as an atomic pile composed of radioactive isotopes (atomic fission products), or a high voltage high energy electron accelerator. Insofar as we are aware, this is the first instance of the conversion of an inorganic carbonate or bicarbonate to an organic compound by high energy electrons. Our invention enables this conversion to take place either by a batch method or by a continuous process.

In accordance with our invention, alkali metal bicarbonates such as sodium or potassium bicarbonate, alkaline earth bicarbonates such as calcium or magnesium bicarbonate, and ammonium bicarbonate or ammonium carbonate can be converted into the corresponding salts of oxalic acid (e.g., sodium oxalate, calcium oxalate, ammonium oxalate) by subjecting the inorganic bicarbonate to a source of high energy electrons. The oxalic acid salts may then, if desired, be converted into oxalic acid by conventional reactions, e.g., treatment with a mineral acid such as sulfuric acid.

The inorganic bicarbonate starting materials may be produced from the corresponding carbonates, e.g., by reacting the latter with carbon dioxide in the presence of water. In the case of ammonium carbonate, this compound may either be converted to ammonium bicarbonate and then subjected to ionizing radiation in accordance with the present invention, or the ammonium carbonate may be directly subjected to ionizing radiation without previously having been converted to ammonium bicarbonate, inasmuch as ammonium carbonate is itself a mixture of ammonium bicarbonate, ammonium carbamate and ammonia (MacLeod et al., J. Biol. Chem. 1, 319).

Inasmuch as calcium carbonate is an abundant, inexpensive and readily available raw material, it will be at once apparent that our invention makes it possible to assure a constant supply of oxalic acid by utilizing this starting material by going through the following steps:

I. 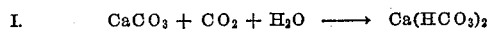

II. 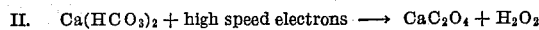

III. 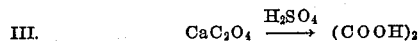

Accordingly, it is a principal object of our invention to convert an inorganic carbonate or bicarbonate to oxalic acid or an oxalate by means of high energy electrons.

A further object of our invention is a new type synthesis wherein an inorganic bicarbonate is converted to an organic compound.

A further object of our invention is the peaceful utilization of the energy of an atomic pile in the production of oxalic acid and/or its salts from a readily available and inexpensive inorganic carbonate or bicarbonate.

Yet another object of our invention is an easily controllable method of utilizing beta rays, or other ionizing radiations produced by high energy electron accelerators for the conversion of an inorganic carbonate to an organic salt (oxalate).

Other objects and advantages of our invention will become apparent from the following description of several examples for carrying out the practice of our invention.

It will be understood, of course, that the following examples are given by way of illustration and are not intended to limit the scope of our invention to specific details.

EXAMPLE I

Substantially pure calcium carbonate is suspended in distilled water, and carbon dioxide gas is admitted until all of the calcium carbonate has become converted to calcium bicarbonate. A number of 250 ml. samples of calcium bicarbonate in water (conc. .137%), are enclosed in polyethylene bags and heat-sealed after manually removing excess air. The bags are then exposed to ionizing radiation furnished by a 2 million electron volt 500 watt Van de Graaff electron accelerator operating at about .25 milliampere current. The beam produced by this instrument is a 2 mega-REP (2 million roentgen equivalent physical units) beam, i.e., a beam furnishing a quantity of ionizing radiation which produces an energy absorption of 2,000,000×83 ergs per gram of material exposed thereto. The bags are passed through the beam for a controlled number of passes producing a predetermined energy absorption of from 10 to 50 mega-REP (see Table I, below). At the end of the irradiation, the formed calcium oxalate is separated and converted to oxalic acid. Yields of about 2–2.3% oxalic acid, based on the quantity of calcium bicarbonate, are obtained.

EXAMPLE II

A number of 250 ml. samples of ammonium carbonate in water (conc. .1%) are sealed in polyethylene bags and treated according to Example I. The ammonium oxalate formed by irradiation is likewise converted to oxalic acid, with yields up to 16.9% on the basis of the starting material (see Table I, below).

EXAMPLE III

Example II is repeated with ammonium bicarbonate, instead of ammonium carbonate. Irradiation produces ammonium oxalate as the intermediate product, which is then converted into oxalic acid. Yields of oxalic acid are up to about 1.9% (see Table I, below).

EXAMPLE IV

Example II is repeated with sodium bicarbonate (instead of ammonium carbonate). Irradiation produces sodium oxalate as the intermediate product, which is then likewise converted into oxalic acid. Yields are up to 2.75%, based on the quantity of sodium bicarbonate starting material (see Table I, below).

Table I

| Starting Material | No. of Passes Through 2 Mega-REP Beam | Total Energy Absorbed in Mega-REP | $(COOH)_2$ Yield (Percent) |
| --- | --- | --- | --- |
| Calcium Bicarbonate (.137% conc.) | 5 | 10 | 2.026 |
|  | 15 | 30 | 2.210 |
|  | 25 | 50 | 2.304 |
| Ammonium Carbonate (.1% conc.) | 5 | 20 | 3.42 |
|  | 10 | 20 | 5.48 |
|  | 20 | 40 | 6.96 |
|  | 25 | 50 | 16.90 |
| Ammonium Bicarbonate (.1% conc.) | 5 | 10 | .882 |
|  | 15 | 30 | 1.647 |
|  | 25 | 50 | 1.859 |
| Sodium Bicarbonate (.1% conc.) | 5 | 10 | 2.29 |
|  | 10 | 20 | 2.29 |
|  | 15 | 30 | 2.75 |

EXAMPLE V

A continuous process for converting calcium carbonate into calcium oxalate is carried out in the following manner. Gaseous carbon dioxide is pumped through a suspension of powdered calcium carbonate in water until the calcium carbonate is converted into calcium bicarbonate. The calcium bicarbonate is then exposed to ionizing radiation by controlled slow passage (e.g., on a conveyor belt) through an "atomic pile" containing radioactive isotopes (atomic fission products), such as $Co^{60}$, until at least about 10 mega-REP (10,000,000 roentgen equivalent physical units) have been absorbed per gram of calcium bicarbonate. After exit from the atmic pile, the converted calcium oxalate is settled out and, if desired, converted to oxalic acid, while the unconverted calcium bicarbonate is recirculated through the "atomic pile" together with a fresh amount of calcium bicarbonate formed in situ by reacting carbon dioxide gas with an aqueous suspension of calcium carbonate.

In lieu of the polyethylene bags mentioned in Examples I–IV, other ionizing energy transmissive materials may be used, e.g., plastics such as "Mylar" (polyalkylene terephthalate, such as polyethylene terephthalate), glass bottles, or glass tubes. Glass tubing or high speed electron transmissive plastic tubing is also appropriate for the continuous process of Example V.

We have also obtained oxalic acid from calcium bicarbonate and other bicarbonates by absorption of ionizing radiation in quantities of less than 2 mega-REP; thus, a yield of 1.375% oxalic acid was obtained from a .1% concentration of calcium bicarbonate by a process according to Example I, but limiting the energy absorption to 1 mega-REP (1 million roentgen equivalent physical units) by a single passage through a 1 mega-REP beam.

We have generally found that higher yields are obtained with relatively low concentrations of starting material, of the order of about .1–.15%. However, higher concentrations, e.g., 10% are also operative; while the oxalic acid yield is generally lower, percentagewise, at such higher concentrations, such lower yield is partly or wholly compensated by being able to subject a larger amount of inorganic material to the ionizing high energy electron beam during each pass. Thus, with ammonium bicarbonate as the starting material (see Example III, above), we have obtained the following yields of oxalic acid at higher concentrations, with dosages of 20 mega-REP:

Concentration of $NH_4HCO_3$:     Yield of $(COOH)_2$, percent
- 1% ---- 0.23
- 5% ---- 0.166
- 10% ---- 0.115

With sodium bicarbonate in 1% concentration as the starting material, a 2.39% yield of oxalic acid is obtained at 10 mega-REP, and a 2.39% yield at 20 mega-REP.

Van de Graaff electron accelerators are available in a number of types at various operating voltages and power outputs, beginning with 1,000,000 electron volts and 25 watts (Type JD); other types have operating voltages and power outputs of 2,000,000 electron volts and 500 watts (Type AD), and 3,000, electron volts and 12,000 watts (Type FD). All of them are capable of delivering effective dosages of ionizing radiation for the practice of our invention.

Likewise, other sources of high energy ionizing high speed electrons other than those specifically set forth in Examples I–IV may be used, e.g., a 1,000,000 volt electron generator (resonance transformer) made by General Electric Company, or a 2,000,000 volt capacitron made by Electronized Chemical Corp., or a linear accelerator (2,000,000 volt or 6,000,000 volt model) produced by Applied Radiation Corp. Other smaller and larger models may of course be substituted. Similarly, "atomic piles" containing sources of ionizing radiation in the form of high speed electrons, other than radioactive cobalt ($Co^{60}$) may be used in lieu of the "atomic pile" of Example V.

It will thus be seen that the practice of our invention is capable of numerous modifications without departing from its spirit. We therefore wish to emphasize that any specific terms utilized in the preceding illustrative description of our invention are not intended to limit the scope of our invention, but rather should be interpreted in a broad and generic sense. We therefore desire to claim our invention with the benefit of a broad interpretation of the scope of our subjoined claims.

We claim:

1. Method of synthesizing a member of the group consisting of oxalic acid and its alkali metal, alkaline earth and ammonium salts, comprising subjecting an aqueous solution of a member of the group consisting of alkali metal bicarbonates, alkaline earth bicarbonates, ammonium bicarbonate and ammonium carbonate, to high energy ionizing radiation having an ionizing effect at least equal to the ionizing effect of a high speed electron beam emanating from an electron accelerator of about 1,000,000 electron volt capacity, until at least a substantial portion of said member of said second-named group is converted to a compound containing an oxalic radical, the quantity of said ionizing radiation absorbed being at least about 1,000,000 roentgen equivalent physical units.

2. Process according to claim 1, wherein the quantity of said ionizing radiation is at least about 2,000,000 roentgen equivalent physical units.

3. A method according to claim 1, wherein said source of said ionizing radiation is a radioactive isotope.

4. A method according to claim 1, wherein said source of said ionizing radiation is a high voltage high speed electron generator.

5. Process according to claim 4, wherein the quantity of said ionizing radiation is at least about 2,000,000 roentgen equivalent physical units.

6. Method of synthesizing oxalic acid, comprising subjecting an aqueous solution of calcium bicarbonate to a source of high energy ionizing radiation having an ionizing effect at least equal to the ionizing effect of a high speed electron beam emanating from an electron accelerator of about 1,000,000 electron volt capacity, until calcium oxalate is formed, the quantity of said ionizing radiation absorbed being at least about 1,000,000 roentgen equivalent physical units, and converting said calcium oxalate into oxalic acid.

7. Continuous process of synthesizing calcium oxalate, comprising subjecting an aqueous solution of calcium bicarbonate to a source of high energy ionizing radiation having an ionizing effect at least equal to the ionizing effect of a high speed electron beam emanating from an electron accelerator of about 1,000,000 electron volt capacity, until a substantial portion of said calcium bicarbonate is converted to calcium oxalate, the quantity of said ionizing radiation absorbed being at least about 1,000,000 roentgen equivalent physical units, separating said calcium oxalate, and recirculating the excess calcium bicarbonate together with a fresh amount of calcium bicarbonate to said source of high energy ionizing radiation.

8. Continuous process of synthesizing calcium oxalate, comprising reacting calcium carbonate with carbon dioxide in the presence of water until calcium bicarbonate is formed, subjecting an aqueous solution of said calcium bicarbonate to a source of high energy ionizing radiation having an ionizing effect at least equal to the ionizing effect of a high speed electron beam emanating from an electron accelerator of about 1,000,000 electron volt capacity, until a substantial portion of said calcium bicarbonate is converted to calcium oxalate, the quantity of said ionizing radiation absorbed being at least about 1,000,000 roentgen equivalent physical units, separating said calcium oxalate, recombining the excess calcium bicarbonate with a fresh amount of calcium bicarbonate formed in situ by reacting calcium carbonate with carbon dioxide in the presence of water, and subjecting an aqueous solution of said mixture to said source of high energy ionizing radiation.

9. Process of synthesizing calcium oxalate, comprising subjecting an aqueous solution of calcium bicarbonate to a source of high energy ionizing radiation having an ionizing effect at least equal to the ionizing effect of a high speed electron beam emanating from an electron accelerator of about 1,000,000 electron volt capacity, until a substantial portion of said calcium bicarbonate is converted to calcium oxalate, the quantity of said ionizing radiation absorbed being at least about 1,000,000 roentgen equivalent physical units.

10. Process of synthesizing oxalic acid, comprising subjecting an aqueous solution of ammonium carbonate to a source of high energy ionizing radiation having an ionizing effect at least equal to the ionizing effect of a high speed electron beam emanating from an electron accelerator of about 1,000,000 electron volt capacity, until a substantial portion of said ammonium carbonate is converted to ammonium oxalate, the quantity of said ionizing radiation absorbed being at least about 1,000,000 roentgen equivalent physical units, and converting said ammonium oxalate to oxalic acid.

11. Process of synthesizing oxalic acid, comprising subjecting an aqueous solution of ammonium bicarbonate to a source of high energy ionizing radiation having an ionizing effect at least equal to the ionizing effect of a high speed electron beam emanating from an electron accelerator of about 1,000,000 electron volt capacity, until a substantial portion of said ammonium bicarbonate is converted to ammonium oxalate, the quantity of said ionizing radiation absorbed being at least about 1,000,000 roentgen equivalent physical units, and converting said ammonium oxalate to oxalic acid.

12. Method of synthesizing oxalic acid, comprising subjecting an aqueous solution of sodium bicarbonate to a source of high energy ionizing radiation having an ionizing effect at least equal to the ionizing effect of a high speed electron beam emanating from an electron accelerator of about 1,000,000 electron volt capacity, until sodium oxalate is formed, the quantity of said ionizing radiation absorbed being at least about 1,000,000 roentgen equivalent physical units, and converting said sodium oxalate into oxalic acid.

13. Process of synthesizing sodium oxalate, comprising subjecting an aqueous solution of sodium bicarbonate to a source of high energy ionizing radiation having an ionizing effect at least equal to the ionizing effect of a high speed electron beam emanating from an electron accelerator of about 1,000,000 electron volt capacity, until a substantial portion of said sodium bicarbonate is converted to sodium oxalate, the quantity of said ionizing radiation absorbed being at least about 1,000,000 roentgen equivalent physical units.

14. Process of synthesizing ammonium oxalate, comprising subjecting an aqueous solution of ammonium bicarbonate to a source of high energy ionizing radiation having an ionizing effect at least equal to the ionizing effect of a high speed electron beam emanating from an electron accelerator of about 1,000,000 electron volt capacity, until a substantial portion of said ammonium bicarbonate is converted to ammonium oxalate, the quantity of said ionizing radiation absorbed being at least about 1,000,000 roentgen equivalent physical units.

15. Process of synthesizing ammonium oxalate, comprising subjecting an aqueous solution of ammonium carbonate to a source of high energy ionizing radiation having an ionizing effect at least equal to the ionizing effect of a high speed electron beam emanating from an electron accelerator of about 1,000,000 electron volt capacity, until a substantial portion of said ammonium carbonate is converted to ammonium oxalate, the quantity of said ionizing radiation absorbed being at least about 1,000,000 roentgen equivalent physical units.

16. A method according to claim 3, wherein said radioactive isotope is $Co^{60}$.

References Cited in the file of this patent
UNITED STATES PATENTS

| | | |
|---|---|---|
| 1,338,352 | Bloom | Apr. 27, 1920 |

OTHER REFERENCES

Hasselstrom et al.: Science, vol. 123, pp. 1038, 1039, June 1956.

UNITED STATES PATENT OFFICE

CERTIFICATE OF CORRECTION

Patent No. 2,886,501                                    May 12, 1959

Torsten Hasselstrom et al.

It is hereby certified that error appears in the printed specification of the above numbered patent requiring correction and that the said Letters Patent should read as corrected below.

Column 3, line 31, for "atmic" read -- atomic --; column 4, line 5, for "3,000, electron volts" read -- 3,000,000 electron volts --.

Signed and sealed this 29th day of September 1959.

(SEAL)
Attest:

KARL H. AXLINE                                          ROBERT C. WATSON
Attesting Officer                                     Commissioner of Patents